(12) United States Patent
Dufresne et al.

(10) Patent No.: US 7,422,081 B2
(45) Date of Patent: Sep. 9, 2008

(54) GRILLE FOR A MOTORCYCLE RADIATOR COVER

(76) Inventors: Michael C. Dufresne, 1358 E. Windsor Rd., Glendale, CA (US) 92105; Aaron Titelman, 1151 Walnut, Apt. #86, Tustin, CA (US) 92780

( * ) Notice: Subject to any disclaimer, the term of this patent is extended or adjusted under 35 U.S.C. 154(b) by 11 days.

(21) Appl. No.: 11/490,939

(22) Filed: Jul. 21, 2006

(65) Prior Publication Data

US 2007/0017721 A1    Jan. 25, 2007

Related U.S. Application Data

(60) Provisional application No. 60/701,201, filed on Jul. 21, 2005.

(51) Int. Cl.
*B60K 11/00* (2006.01)

(52) U.S. Cl. .................. 180/68.1; 180/68.6; 293/115

(58) Field of Classification Search .............. 180/68.1, 180/68.6; 293/115
See application file for complete search history.

(56) References Cited

U.S. PATENT DOCUMENTS

| 4,169,501 A | | 10/1979 | Takeuchi et al. | |
|---|---|---|---|---|
| 4,537,273 A | * | 8/1985 | Funabashi | 180/229 |
| 4,570,740 A | * | 2/1986 | Hara | 180/229 |
| 5,162,019 A | * | 11/1992 | Widmaier et al. | 454/147 |
| 5,984,035 A | | 11/1999 | Katoh et al. | |
| D461,157 S | * | 8/2002 | Myers et al. | D12/216 |
| 6,971,438 B2 | * | 12/2005 | Oki et al. | 165/41 |
| 7,028,797 B2 | * | 4/2006 | White | 180/68.1 |
| 2004/0069550 A1 | * | 4/2004 | Ito et al. | 180/68.1 |
| 2004/0140140 A1 | * | 7/2004 | Guay et al. | 180/210 |

\* cited by examiner

*Primary Examiner*—Paul N. Dickson
*Assistant Examiner*—Katy Meyer
(74) *Attorney, Agent, or Firm*—James Ray & Assoc.

(57) ABSTRACT

The invention provides a grille for a radiator cover having a front end with a pair of air intake apertures formed therewithin, and a pair of bezel frames each fastened to such radiator cover adjacent a respective one of such pair of air intake apertures, each bezel frame having an aperture exposing such respective air intake aperture. The grille includes a unitary elongated member having each of a predetermined size and a predetermined shape and a paper-thin like peripheral edge surrounding the unitary member. The member is caged between the bezel frame and the front end of the radiator cover. A plurality of apertures are formed in the unitary member for enabling air flow and for preventing entry of a detrimental extraneous foreign material into each air intake opening.

9 Claims, 5 Drawing Sheets

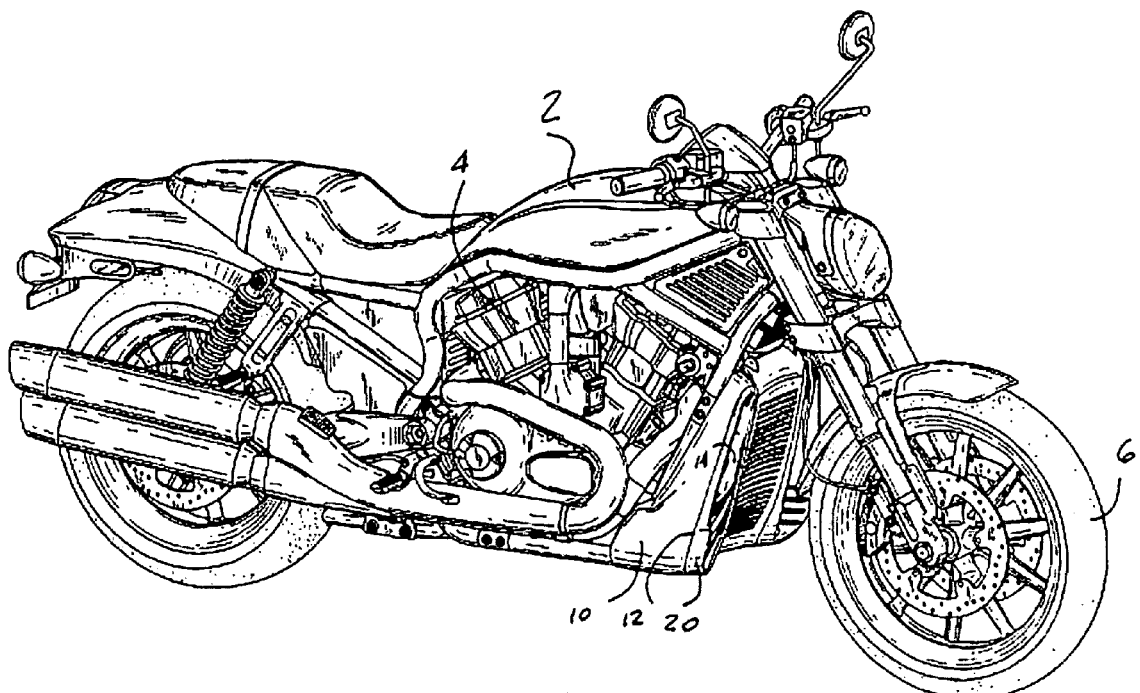
FIG. 1
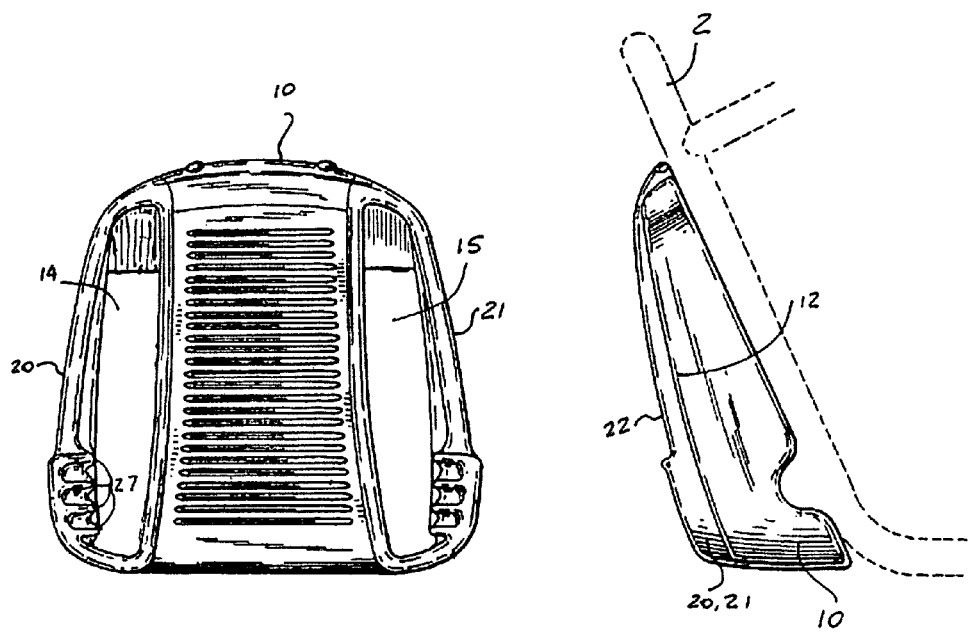
FIG. 2
(Prior Art)
FIG. 3
(Prior Art)

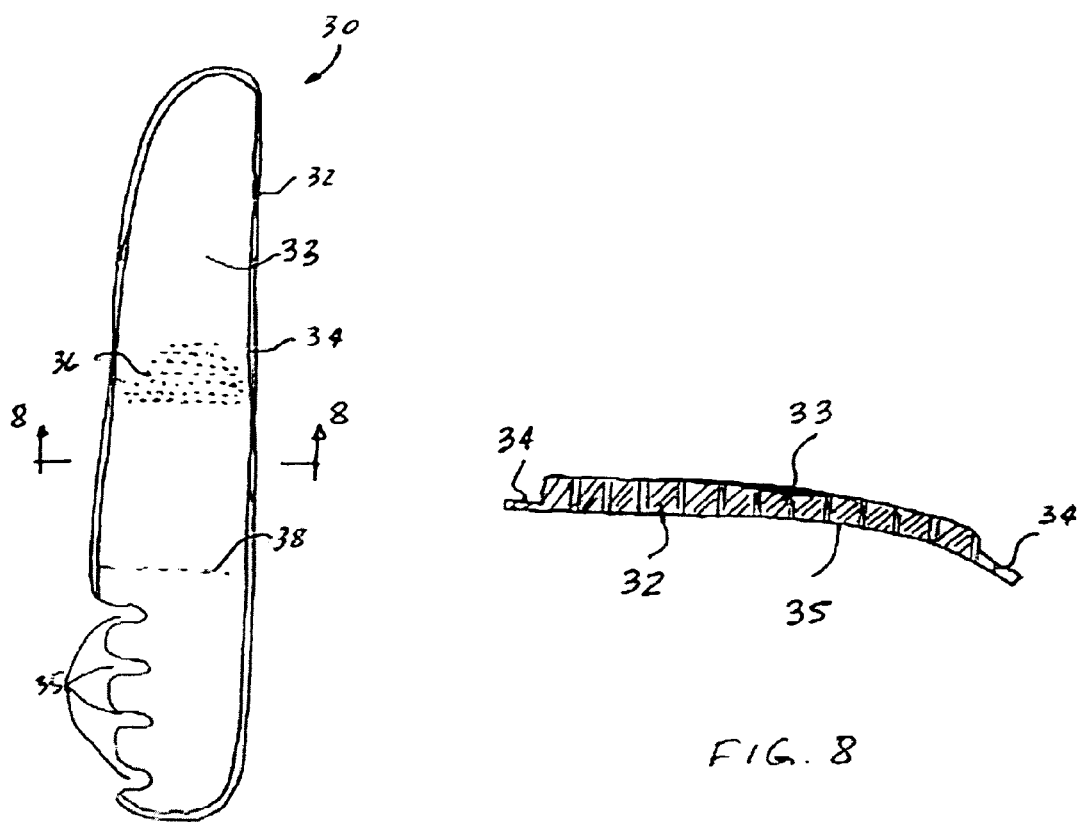
FIG. 7
FIG. 8
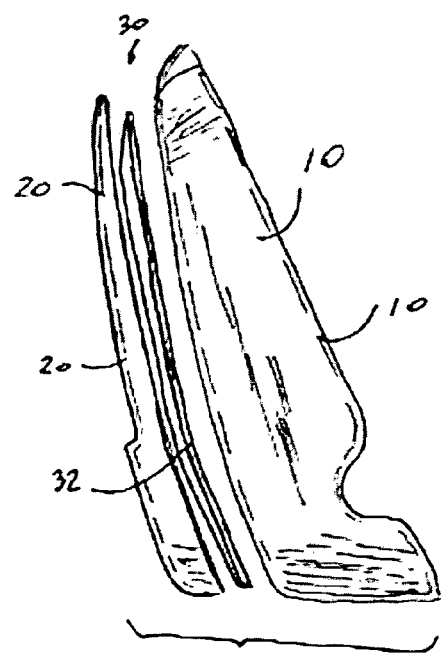
FIG. 9

GRILLE FOR A MOTORCYCLE RADIATOR COVER

CROSS-REFERENCE TO RELATED APPLICATIONS

This application is related to and claims priority from a provisional patent application Ser. No. 60/701,201 filed on Jul. 21, 2005.

FIELD OF THE INVENTION

The present invention relates, in general, to cooling devices and, more particularly, this invention relates to a grille for a radiator cover employed in a fluid cooled motorcycle engines.

BACKGROUND OF THE INVENTION

One problem that is encountered by owners of VRSC family motorcycles manufactured by Harley-Davidson of Milwaukee, Wis. is in a design of the radiator cover of its fluid cooled engine. The radiator cover has a pair of elongated air intake openings formed in its front end and positioned toward the front wheel of the motorcycle. Each air intake opening is approximately 3 inches wide and approximately 13 inches long and is only encased by an ornamental bezel frame which has a complimentary mating opening. Consequently, a detrimental extraneous foreign material such as leaves, branches, cigarettes remnants, rocks and the like present in an operating environment of the motorcycle enters these air intake openings and accumulates on the front surface of the radiator during riding.

Accordingly, the owners of these motorcycles are forced to remove radiator cover in order to clean the radiator surface for optimum engine performance.

Therefore, there is a need for a device used in combination with the radiator cover for enabling air flow to the radiator while preventing entry of the detrimental extraneous foreign material.

SUMMARY OF THE INVENTION

According to one embodiment, the invention provides an improvement for a radiator cover used on a fluid cooled motorcycle engine. Such radiator cover has a front end and a pair of air intake apertures formed therewithin. A pair of bezel frames are provided, wherein each bezel frame is fastened to such radiator cover adjacent a respective one of such pair of air intake apertures. Each bezel frame has an aperture formed therewithin which exposes such respective air intake aperture. The improvement includes a grille which is engageable at least with each bezel frame for enabling air flow and for preventing entry of a detrimental extraneous foreign material present in an operating environment of such motorcycle into such radiator cover.

According to another embodiment of the invention, therein is provided a bezel for covering an air intake aperture formed in a front end of a radiator cover used on a fluid cooled motorcycle engine, wherein such front end is oriented toward the front wheel of such motorcycle. The bezel includes a generally thin surface portion. A plurality of apertures are formed in the generally thin surface portion. The plurality of apertures enable air flow into the radiator cover through the air intake aperture and prevent entry of a detrimental extraneous foreign material into the radiator cover. A flange extends outwardly from a peripheral edge of the generally thin surface portion. The flange is shaped to fittingly engage such front end of such radiator cover. A fastening means is provided for releaseably mounting the bezel to such front end of such radiator cover.

According to yet another embodiment, the invention provides an improved radiator cover for a fluid cooled motorcycle engine, such radiator cover having a front end and a pair of air intake apertures formed therewithin. The improvement includes a pair of generally thin members formed integral to such radiator cover each covering a respective one of such pair of air intake apertures. Each member includes a plurality of apertures formed therewithin for enabling air flow and for preventing entry of a detrimental extraneous foreign material into such radiator cover. The detrimental extraneous foreign material is being present in an operating environment of such motorcycle.

OBJECTS OF THE INVENTION

It is, therefore, one of the primary objects of the present invention to provide a grille for a motorcycle radiator cover for enabling air flow to the radiator of such motorcycle and for preventing entry of the detrimental extraneous foreign material into the radiator cover.

Another object of the present invention is to provide a grille for a motorcycle radiator cover which can be easily installed on the motorcycles presently in use.

Yet another object of the present invention is to provide a grille for a motorcycle radiator cover which does not require use of fasteners during installation.

A further object of the present invention is to provide a grille for a motorcycle radiator cover which is simple and economical to manufacture.

Yet a further object of the present invention is to provide a bezel for an air intake opening of the motorcycle radiator cover which enables air flow to the radiator of such motorcycle and prevents entry of the detrimental extraneous foreign material into the air intake opening formed in the radiator cover.

An additional object of the present invention is to provide a radiator cover for a fluid cooled engine used on a motorcycle which enables air flow to the radiator of such motorcycle and prevents accumulation of the detrimental extraneous foreign onto the radiator surface.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE DRAWINGS

FIG. 1 is a perspective view of a prior art motorcycle employing a fluid cooled engine and particularly illustrating a prior art radiator cover and a bezel frame shown in a position of use from the right side of the motorcycle;

FIG. 2 is a front elevation view of the prior art radiator cover in combination with the prior art bezel frame;

FIG. 3 is a side elevation view of the prior art radiator cover and the bezel frame of FIG. 2;

FIG. 7 is a front elevation view of a grille constructed according to one embodiment of the present invention;

FIG. 8 is a cross-sectional view of the grille along lines 8-8 of FIG. 7, particularly illustrating peripheral edge having a reduced thickness to fit with the lip formed around the aperture of the prior art bezel frame;

FIG. 9 is an exploded side elevation view of the grille of FIG. 7 installed between the radiator cover and bezel frame;

BRIEF DESCRIPTION OF THE VARIOUS EMBODIMENTS OF THE INVENTION

Figures 4, 5, 6:
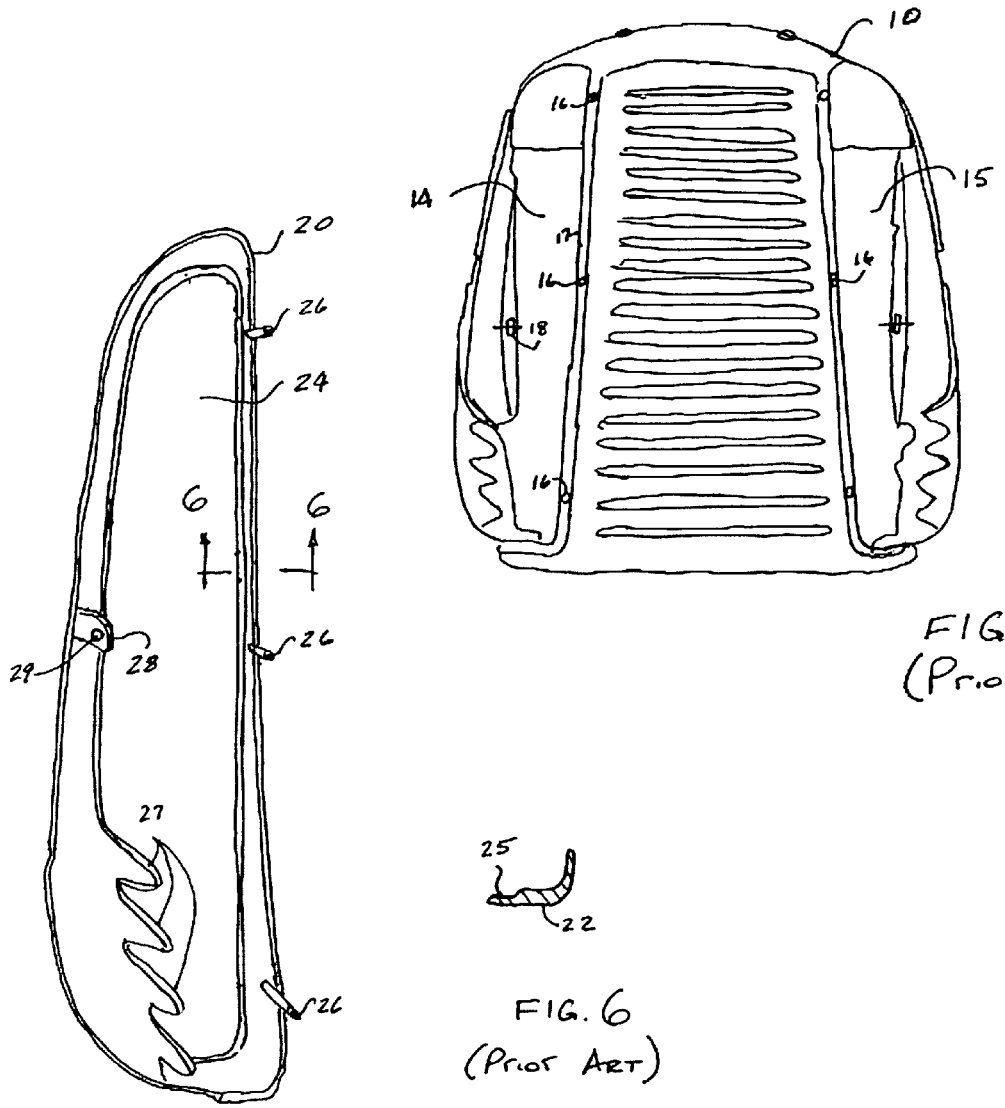
FIG. 4 is front elevation view of the prior art radiator cover.
FIG. 5 is a rear elevation view of the prior art bezel frame.
FIG. 6 is a cross-sectional view of the prior art bezel frame along lines 6-6 of FIG. 5, particularly illustrating a lip which surrounds the aperture formed in the bezel frame.

Prior to proceeding to the more detailed description of the present invention, it should be noted that, for the sake of clarity and understanding, identical components which have identical functions have been identified with identical reference numerals throughout the several views illustrated in the drawing figures.

The present invention will be illustrated in use with a motorcycle 2 employing a fluid cooled engine 4 and best shown in FIG. 1. Such motorcycle 2 is presently manufactured for example by a Harley-Davidson of Milwaukee, Wis. under the VRSC family series including models known as VRSCX, VRSCAW V-Rod.RTM, VRSCR Street Rod.RTM, VRSCD Night Rod.RTM and VRSCDX Night Rod.RTM Special.

Reference is now made, to FIGS. 2-6, wherein there is shown a prior art radiator cover 10 for the motorcycle 2. The radiator cover 10 has a front end 12 which is positioned toward the front wheel 6. A pair of air intake apertures 14 and 15 are formed within the front end 12. The openings 14 and 15 have identical size and shape but are positioned in a mirror manner in relationship to a longitudinal centerline of the radiator cover 10. Each aperture 14, 15 is approximately 3 inches wide and approximately 13 inches long. As it is well known, the air intake apertures 14, 15 allow entry of a detrimental extraneous foreign material such as leaves, branches cigarettes remnants, rocks and the like present in an operating environment into the radiator cover 10 and, more particularly, enable accumulation of such detrimental extraneous foreign material on the front radiator surface (not shown).

In further reference to FIG. 2-6, therein is shown a pair of prior art bezel frames 20, 21 each positioned adjacently a respective one of the pair of air intake apertures 14, 15 and removably fastened to such radiator cover 10. The bezel frames 20 and 21 are identical except for basically a right hand and a left hand configuration. Accordingly, the following description will be concerned with the bezel frame 20, as those skilled in the art will readily understand that use of the present invention with the bezel frame 21 which is disposed adjacent its respective air intake aperture 15 is identical to the present invention used in combination with the bezel frame 20 other than the direction of bending or orientation of flanges of such bezel frame 20.

The prior art bezel frame 20 has an aperture 24 formed within a front end 22. The aperture 24 is generally equal in size and shape to the air intake aperture 14 of the radiator cover 10. Accordingly, the prior art bezel frame 20 performs only an ornamental function and does not prevent entry of a detrimental extraneous foreign material into the air intake aperture 14 and accumulation of such detrimental extraneous foreign material on the front surface (not shown) of the radiator (not shown).

In a particular reference to FIG. 6, the bezel frame 20 includes a generally thin lip 25 which surrounds the aperture 24 except for a portion thereof which is disposed adjacent fingers 27. The lip 25 is about 0.125 inches wide and forms a step with the rear surface of the front end 22 which has been determined to be about 0.020 inches.

The prior art bezel frame 20 has a plurality of elongated tubular members 26 which extend outwardly and generally perpendicular to the rear surface of the front end 22 and which are positioned along one edge of the aperture 24. A mounting bracket 28 is rigidly attached to the rear surface of the front end 22 adjacent an opposed edge of the aperture 24. The bracket 28 has a mounting aperture 29 whose axis is disposed generally perpendicularly to direction of the elongated tubular members 26.

To removably fasten the bezel frame 20 to the radiator cover 10, the later is adapted with a plurality of apertures 16 which are positioned in a lip 17 which is formed adjacent one edge of the air intake aperture 14 and which are aligned with the tubular members 26 of the bezel frame 20 and a complimentary mounting bracket 18 which is positioned adjacent an opposed edge of the air intake aperture 14 and has an aperture (not shown) which is aligned with the aperture 29 formed in the mounting bracket 28 of the bezel frame 20.

Now in reference to FIGS. 7-9, therein is illustrated an improvement for preventing entry of the detrimental extraneous foreign material into the radiator cover 10 through the air intake aperture 14 according to one embodiment of the invention.

Such improvement comprises a grille means, generally designated as 30, which includes a unitary elongated member 32 having each of a predetermined size and a predetermined shape. The elongated member 32 preferably has a paper-thin like peripheral edge 34, best shown in FIG. 8, which surrounds the surface portion 33 of the unitary member 32 except for a portion thereof provided with notches 35 to fit around fingers 27 of the bezel frame 20. A plurality of apertures 36 are formed in such surface portion 33.

In a particular reference to FIG. 9, the unitary member 32 is caged between such front end 12 of such cover 10 and the bezel frame 20. Accordingly, the paper-thin like peripheral edge 34 of the unitary member 32 abuts the inner surface of the lip 25 of the bezel frame 20 and has a thickness being equal to or less than 0.020 inches to enable alignment of the plurality of apertures 16 with the plurality of tubular members 26 and more particularly, enabling alignment of the aperture (not shown) formed within the mounting bracket 18 with the aperture 29 of the mounting bracket 28 of the bezel frame 20. Such alignment enables fastening of the bezel frame 20 to the front end 12 on the motorcycle engine that were manufactured prior to the present invention. It would be appreciated that plurality of apertures 36 enable air flow into the radiator cover 10 through the air intake aperture 14 but prevent entry of such detrimental extraneous foreign material into the radiator cover 10.

The thickness of the surface portion 33 of the elongated member 32 may be identical to the thickness of the peripheral edge 34, but, preferably, the thickness of the surface portion 33 is greater than the paper-thin like peripheral edge 34 to improve rigidity of the elongated member 32 during use in harsh applications, for example such as off-road driving. It has been found that a thickness of between about 0.030 inches and about 0.040 inches is sufficient to maintain desired rigidity.

To accommodate the size of the aperture 24 of the prior art bezel frame 20, the presently preferred length of the elongated member 32 is about 15.13 inches and the presently preferred width of its widest section disposed generally adjacent the bend line 38 is about 3.38 inches.

To accommodate the shape of the prior art bezel frame 20, the grille means 30 includes an angular bend 38 formed across a width of the elongated member 32 and dividing it into a pair of surface portions disposed at an angle to each other. The grille means 30 further includes a curvature 35 laterally formed within the elongated member 32.

Figure 10:
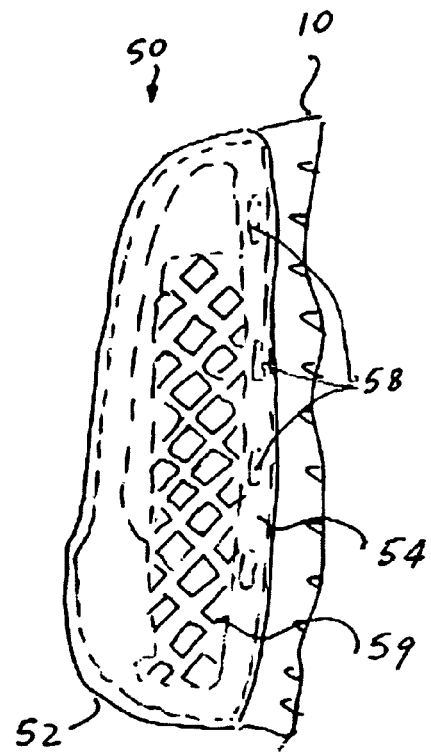
FIG. 10 is a front elevation view of a grille constructed according to another embodiment of the present invention.

The elongated member 32 is preferably manufactured from a metal such as aluminum and, more particularly, such as a perforated aluminum already incorporating round apertures 36 therein. Alternatively, expanded type aluminum may be used with apertures 36 being of a diamond shape, as best shown in FIG. 10. Alternative materials such as steel and plastic and their combination as well as alternative shapes of the apertures 36 may be employed in the instant invention.

It will be apparent to those skilled in the art that the grille means 30 may be simply and economically manufactured from the perforated or expanded material and may be easily installed without the use of additional fasteners or adhesives.

Figure 11:
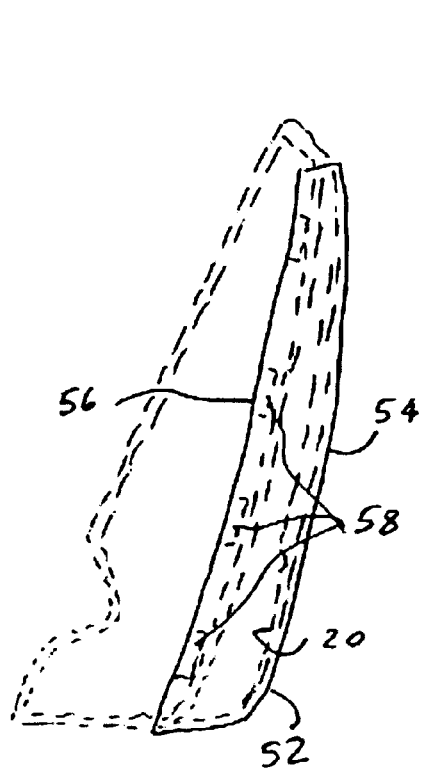
FIG. 11 a side elevation view of the grille of FIG. 10.

Now in a particular reference to FIGS. 10-11, therein is illustrated an improvement for preventing entry of the detrimental extraneous foreign material into the radiator cover 10 through the air intake aperture 14 according to another embodiment of the invention.

Such improvement comprises a grille means, generally designated as 50, which includes a member 52 having a generally thin surface portion 54 and a flange 56 which extends outwardly from the surface portion 54. The flange 56 is shaped to fit an exterior surface of at least one of such front end 12 and such bezel frame 20 being attached thereto. A fastening means 58 is provided for mounting the grille means 50 to such exterior surface in one of a semi-permanent and permanent manner. Such fastening means 58 may include one of an adhesive, a double-faced adhesive tape and a hook and loop fastener. A plurality of apertures 59 formed in the surface portion 54 enable air flow into the radiator cover 10 through the air intake aperture 14 and prevent entry of such detrimental extraneous foreign material into the radiator cover 10. Such grille means 50 may be simply and economically manufactured from a perforated or expanded material by a stamping process.

Figure 12:
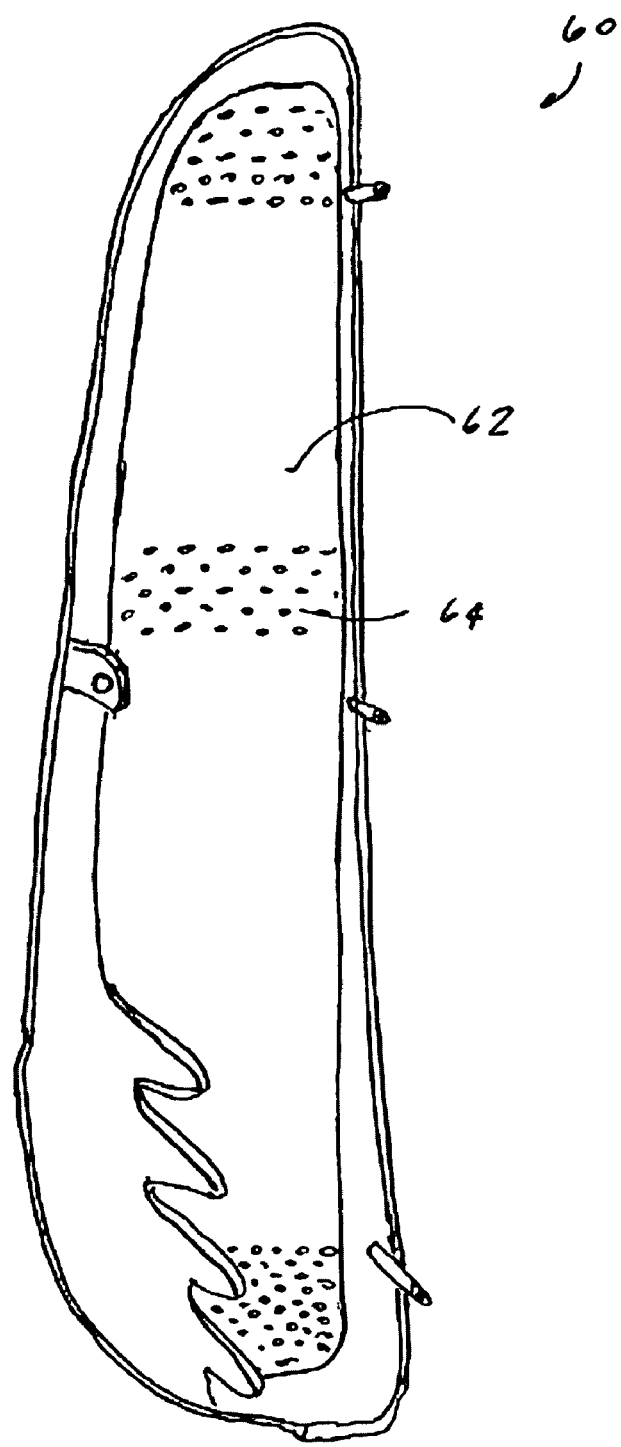
FIG. 12 is a rear elevation view of an improved bezel of the present invention for use with the radiator cover of a fluid cooled motorcycle engine.

Now in a particular reference to FIG. 12, therein is illustrated an improvement for preventing entry of the detrimental extraneous foreign material into the radiator cover 10 through the air intake aperture 14 according to yet another embodiment of the invention.

Such improvement includes a bezel, generally designated as 60, which is constructed identical to the prior art bezel frame 20 except that the bezel 60 includes a generally thin surface portion 62 which is formed integral to the bezel 60 and which essentially closes the aperture 22 of the prior art bezel frame 20. A plurality of apertures 64 are formed in the generally thin surface portion 60 which enables air flow and prevents entry of such detrimental extraneous foreign material into such radiator cover 10.

Figure 13:
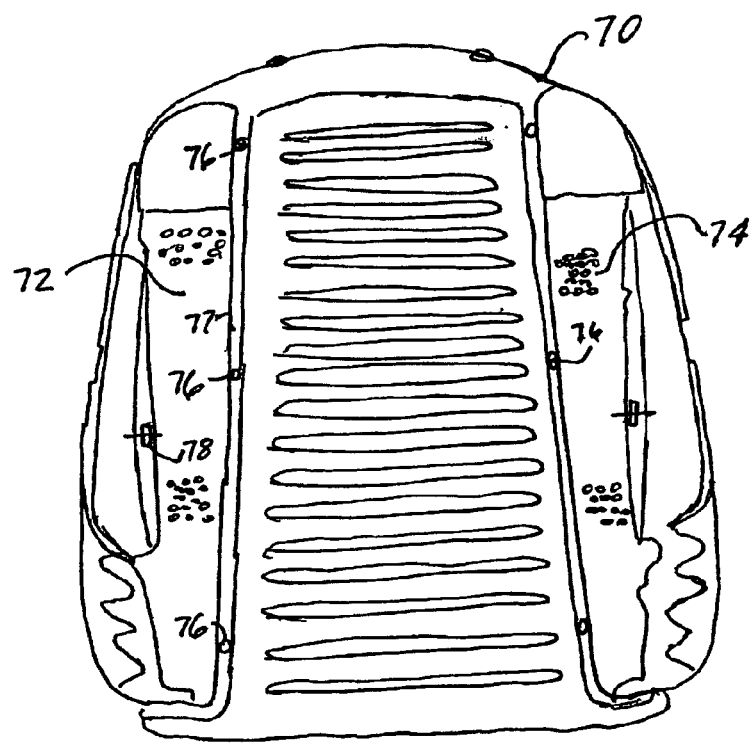
FIG. 13 is a front elevation view of an improved radiator cover for a fluid cooled motorcycle engine.

According to a further embodiment of the invention, best shown in FIG. 13, the improvement includes a radiator cover 70 having a pair of generally thin surface portions 72 which are formed integral to the front end of the radiator cover 70. Essentially, each surface portion 72 closes its respective aperture 14 of the prior art radiator cover 10. A plurality of apertures 74 are formed in each generally thin surface portion 72 enabling air flow into the radiator cover 70 but which prevent entry of such detrimental extraneous foreign material thereinto A plurality of mounting apertures 76 formed in a lip 77 which is disposed adjacent one edge of the surface portion 72 and a mounting bracket 78 which is disposed adjacent an opposed edge of the surface portion 72 are provided for mounting the prior art bezel frame 20.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. In combination with a radiator cover for a fluid cooled motorcycle engine, such radiator cover having a front end and a pair of air intake apertures formed therewithin, and a pair of bezel frames each fastened to such radiator cover adjacent a respective one of such pair of air intake apertures, each bezel frame having an aperture exposing such respective air intake aperture, an improvement comprising a pair of grille means for enabling air flow and for preventing entry of a detrimental extraneous foreign material into such radiator cover, such detrimental extraneous foreign material being present in an operating environment of such motorcycle, each grille means comprising:
   (a) a generally planar unitary elongated member caged during installation between an exterior surface portion of said front end of said radiator cover and an interior surface portion of a respective bezel frame, said elongated member having each of a predetermined size and a predetermined thickness;
   (b) a paper-thin like peripheral edge formed on said unitary member, said peripheral edge having a first surface thereof directly abutting said exterior surface portion of said front end of said radiator cover and having an opposed second surface thereof directly abutting said interior surface portion of said respective bezel frame, wherein a thickness of said peripheral edge is smaller than said predetermined thickness of said unitary member; and
   (c) a plurality of apertures formed in said unitary member, said plurality of apertures enabling said air flow and preventing said entry of said detrimental extraneous foreign material into said radiator cover.

2. The improvement, according to claim 1, wherein said grille means includes an angular bend formed across a width of said elongated member and dividing said elongated member into a pair of surface portions disposed at an angle to each other for fitting a profile of each said radiator cover and said bezel frame.

3. The improvement, according to claim 1, wherein said bezel frame has a generally thin lip surrounding said aperture thereof and wherein said paper-thin like peripheral edge of said unitary member engages such lip and has a thickness being equal to or less than 0.020 inches.

4. The improvement, according to claim 1, wherein each of said plurality of apertures formed in said unitary member has a round shape.

5. The improvement, according to claim 1, wherein a material of said unitary elongated member is one of a metal, a plastic and a combination thereof.

6. The improvement, according to claim 1, wherein said unitary member includes a plurality of edge notches for fitting around fingers extending outwardly from a surface of said each bezel frame.

7. The improvement, according to claim 1, wherein said each grille means includes:
  (a) a flange extending outwardly from said peripheral edge, said flange shaped to fittingly engage at least said exterior surface of said front end of said radiator cover; and
  (b) a fastening means for mounting said grille means to said exterior surface in one of a semi-permanent and permanent manner.

8. The improvement, according to claim 7, wherein said fastening means includes one of an adhesive, a double-faced adhesive tape and a hook and loop fastener.

9. The improvement, according to claim 1, wherein said predetermined thickness of said unitary elongated member is between about 0.030 inches and about 0.040 inches.

* * * * *